United States Patent [19]

Millar et al.

[11] Patent Number: 4,845,808
[45] Date of Patent: Jul. 11, 1989

[54] RAMP HANDLE

[75] Inventors: Thomas H. Millar, San Marino; Birk C. Sorensen, Whittier, both of Calif.

[73] Assignee: Juralco, Inc., Industry, Calif.

[21] Appl. No.: 119,161

[22] Filed: Nov. 10, 1987

[51] Int. Cl.$^4$ .............................................. B60P 1/00
[52] U.S. Cl. .................................. 16/114 R; 16/124; 16/DIG. 12; 414/537
[58] Field of Search ............... 16/114 R, 124, 125, 16/DIG. 12; 30/514, 517, 518, 519, 520; 182/106, 222, 16; 414/537; 220/85 D, 85 E, 85 R, 94 R; 294/15, 26, 27.1, 902, 1.1; 296/61; 224/42.08, 42.44, 42.42

[56] References Cited

U.S. PATENT DOCUMENTS

| | | | |
|---|---|---|---|
| 3,232,476 | 2/1966 | Cloyd | 220/94 R |
| 3,473,187 | 10/1969 | Schreyer et al. | 16/125 |
| 4,198,187 | 4/1980 | Mountz | 414/537 |
| 4,380,415 | 4/1983 | Higginson et al. | 414/537 |

Primary Examiner—Nicholas P. Godici
Assistant Examiner—Edward A. Brown
Attorney, Agent, or Firm—Lyon & Lyon

[57] ABSTRACT

A handle for a ramp includes a grip, a bridge spanning the two ends of the grip, and two legs extending from the bridge parallel to each other. The bridge runs at an angle with respect to the legs. The handle is comprised of a short section of an aluminum extrusion. A side rail has an end face angled to mate with the bridge, and also includes channels which slidably engage the legs of the handle. The side rail is an aluminum extrusion.

18 Claims, 2 Drawing Sheets

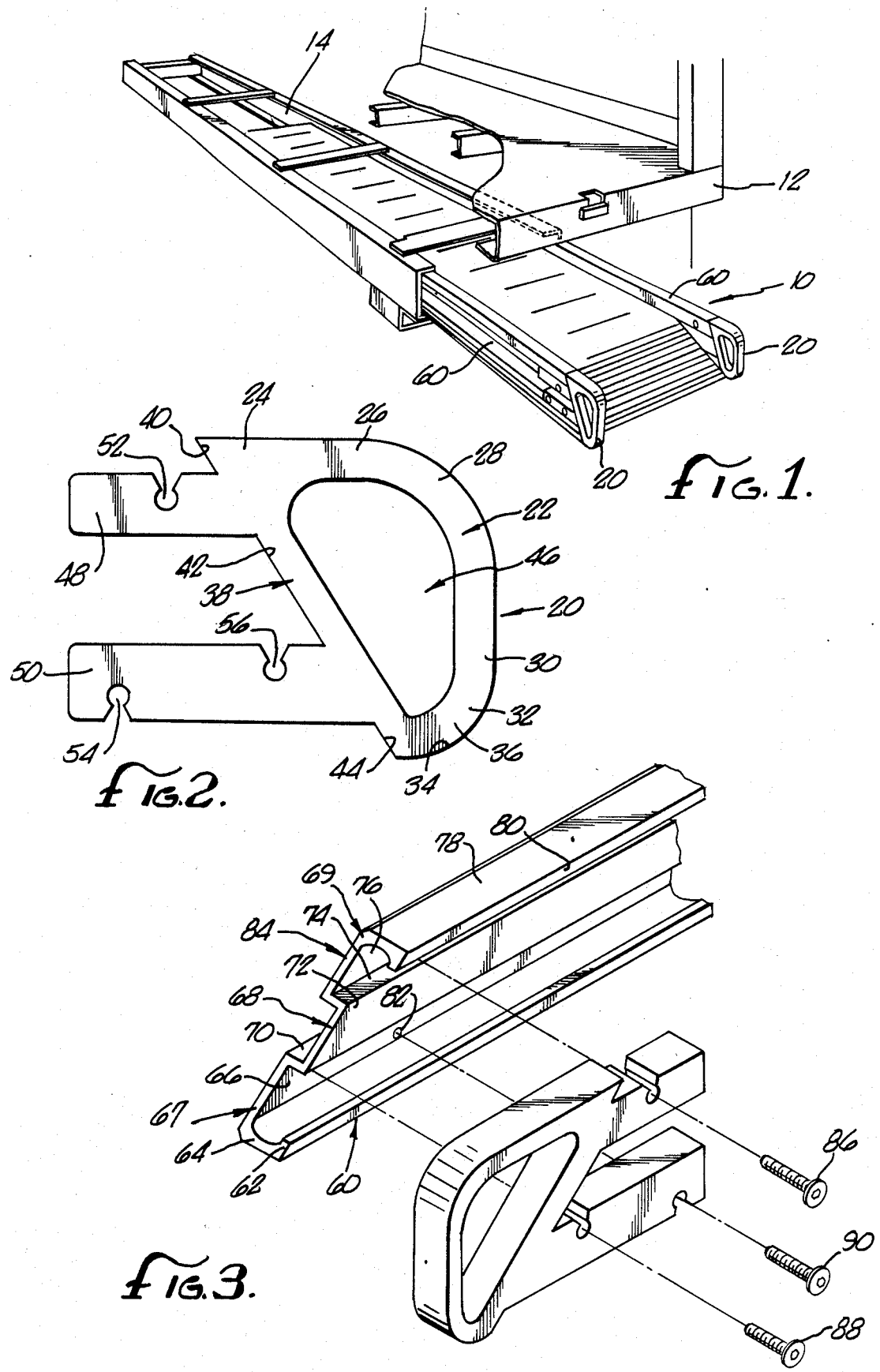

RAMP HANDLE

BACKGROUND OF THE INVENTION

The field of the present invention is ramps and handles for ramps.

Ramps, such as walk ramps are often provided for loading and unloading vehicles, e.g., trucks, boats and aircraft. In addition, ramps may be used in fixed locations, such as in a warehouse. In many applications, and especially in vehicles, the ramp is withdrawn from a stored position by hand for loading and unloading. Consequently, the lower end of the ramp may be dropped to the ground as the ramp is withdrawn. Accordingly, the end of the ramp, and especially handles provided thereon to facilitate handling of the ramp, are subject to damage by high impact forces.

Previously, such ramp handles have typically been aluminum castings. While these cast handles may have performed satisfactorily, the cast aluminum material can be relatively brittle and vulnerable to cracking when the ramps are dropped.

SUMMARY OF THE INVENTION

The present invention is directed to an impact-resistant handle for a ramp. To this end, the handle includes a grip having its ends spanned by a bridge with first and second legs extending from the bridge parallel to each other. The handle comprises an integral section from an aluminum extrusion. Preferably, the handle is joined to a ramp rail having channels dimensioned to slidably engage the legs of the handle.

Accordingly, it is an object of the invention to provide a ramp handle which is readily able to better withstand high impact forces without cracking or excessive deformation.

It is also an object of the invention to provide a handle-ramp rail assembly which is relatively inexpensive, aesthetically attractive, durable and tough.

Other objects and features of the present invention will appear hereinafter.

BRIEF DESCRIPTION OF THE DRAWINGS

In the drawings, wherein similar reference characters denote similar elements throughout the several views:

FIG. 1 is a perspective view of a ramp having the ramp handle and rail of the present invention, with the ramp partially extended from a vehicle body;

FIG. 1 is a side elevation view of the handle of FIG. 1;

FIG. 3 is a exploded perspective fragment view of the handle and ramp rail of the ramp of FIG. 1;

DETAILED DESCRIPTION OF THE PREFERRED EMBODIMENT

Figure 4:
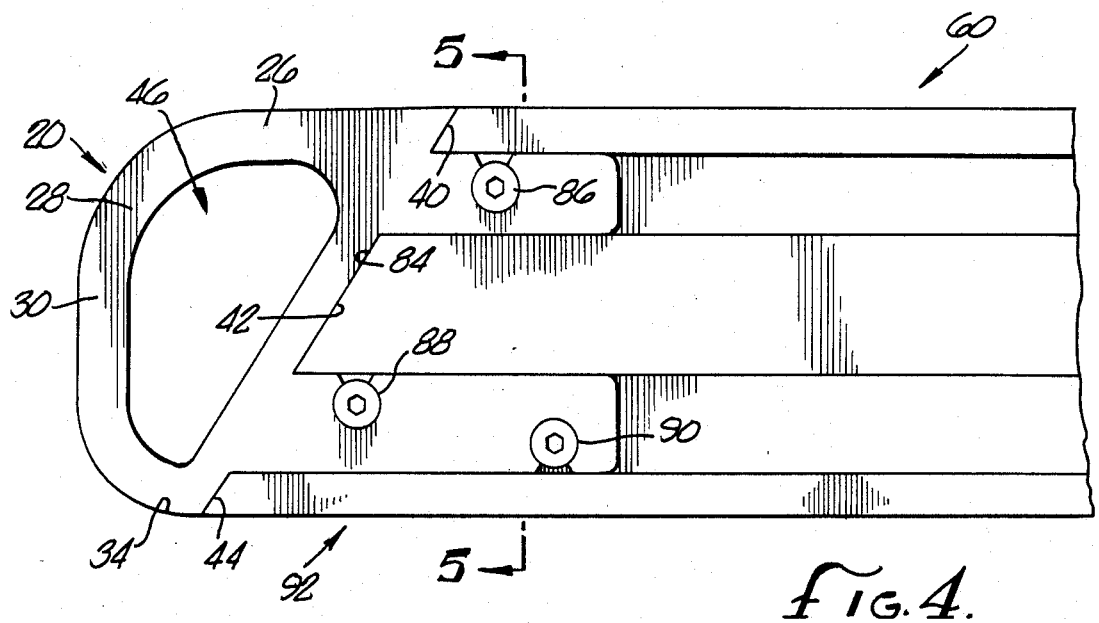
FIG. 4 is a fragmentary side elevation view of the ramp of FIG. 1.

Referring now in detail to the drawings, FIG. 1 illustrates a ramp 10 partially projecting from an opening 14 within a vehicle body 12, such as truck, in a conventional manner. The ramp 10 includes side rails 60 and handles 20.

Referring to FIG. 2, the handle 20, which preferably is an integral, one-piece extruded aluminum section, includes a grip 22 having an upper grip end 24 leading into an extension 26, an extension radius 28, and an upright 30. The extension 26 and upright 30 are generally perpendicular to each other. A bridge radius 32 extends from the upright 30 to a lower grip end 36 having a base edge 34. A bridge 38 runs from the lower grip end 36 to the upper grip end 24, such that the grip 22 defines a closed somewhat triangular opening 46.

The bridge 38 includes upper, center, and lower butting surfaces, 40, 42, and 44, respectively. Extending from the bridge, between the upper butting surface 40 and the center butting center 42 is a first upper leg 48. Similarly, a lower leg 50 extends from the portion of the bridge 38 between the center butting surface 42 and the lower butting surface 44. The lower leg 50 is substantially parallel to the upper leg 48, with both legs 48 and 50 also being generally parallel to the extension 26, and correspondingly, perpendicular to the upright 30. A fastener opening 52 is provided in the upper leg 48, while two fastener openings, 54 and 56 are provided on opposite sides of the lower leg 50. The fastening openings 52, 54 and 56 may be formed as key-hole-type slots, such that they can be an extruded feature, obviating the need for drilling operations on the handle subsequent to its extrusion.

Figure 5:
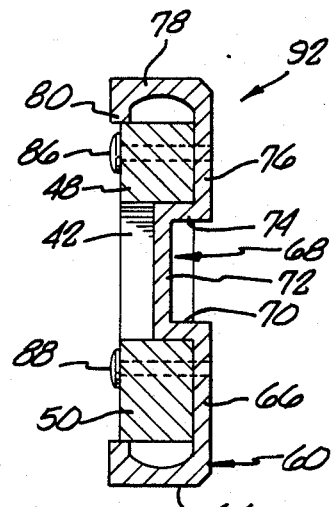
FIG. 5 is a section view taken along line 5—5 of FIG. 4.

As shown on FIGS. 3, 4 and 5, the handle 20 is dimensioned to engage a extruded side rail 60. The side rail 60 includes a lower section 67 having a base lip 62 extending upright from a base 64. A base wall 66 extends generally perpendicularly to the base 64, and parallel to the base lip 62, to a joggle 68 disposed towards the center of the side rail 60. The joggle 68 includes a joggle lower wall 70, a joggle wall 72, and a joggle upper wall 74, which together form a channel-like structure.

An upper section 69 of the rail 60 extends from the joggle 68 and includes an upper wall 76, a cover 78, and a cover lip 80 in a configuration similar to the lip 62, the base 64, and the base wall 66 of the lower section 67. However, as best shown in FIG. 5, the base wall 66 may be longer in the vertical direction than the upper wall 76. Holes 82 are provided in the rail 60 to accommodate fasteners 86, 88 and 90. The holes 82 may be threaded, or they may be through holes with nuts provided on the outside of the rail 60 to engage the fasteners 86, 88, and 90.

The handle 20 is dimensioned to closely fit into the side rail 60. The precise engagement of the handle 20 and rail 60 is facilitated by the extrusion process, which is able to produce these components to very tight tolerances. As shown in FIGS. 4 and 5, the upper leg 48 of the handle 20 engages the channel or rail opening formed by the joggle upper wall 74, the upper wall 76, the cover 78, and the cover lip 80. In a similar manner, the lower leg 50 of the handle 20 closely fits into the rail opening formed by the joggle lower wall 70, the base wall 66, the base 64, and the base lip 62.

Referring to FIGS. 3 and 4, the rail 60 has an end face 84 cut at the angle which is the compliment of the angle formed between the upper and lower legs 48 and 50, and the bridge 38 of the handle 20. As a result, when the handle 20 is engaged into the rail 60, not only do the legs 48 and 50 closely engage the rail, but also, the butting surfaces 40, 42, and 44 of the bridge 38 on the handle 20 butt against the end face 84 of the rail 60. In addition, the base edge 34 of the handle 20 aligns with the outside surface of the base 64 of the rail 60. Correspondingly, the upper grip end 24 aligns with the upper surface of the cover 78 of the rail 60. The fasteners 86, 88, and 90 secure the handle 20 to the rail 60 to form a handle-rail assembly 92.

This handle-rail assembly 92 includes several advantages. By providing the entire handle 20 as an extrusion, the handle can be cut to any desired thickness, and little subsequent machining or finishing operations are required. In addition, the handle material may be a ductile, as opposed to a brittle alloy, such that the handle can readily absorb the shock impact of striking the ground if the ramp is dropped. Moreover, due to the engagement of the handle and extrusion, and the precise fit therebetween, load forces are primarily transferred via the legs and butting surfaces directly from the handle to the rail or from the rail to the handle, with the fasteners carrying a relatively small load. This advantage reduces the likelihood of pivoting about or overstressing the fasteners, thereby providing a highly durable handle-rail assembly. Furthermore, the handle and rail may be produced quickly and easily at low cost. The handle-rail assembly also has an aesthetic appearance.

Thus, a handle and rail are disclosed which provide a durable, attractive, and low cost ramp. While embodiments and applications of this invention have been shown and described, it would be apparent to those skilled in the art that many more modifications are possible without departing from the inventive concepts herein. The invention, therefore, it not to be restricted except in the spirit of the appended claims.

What is claimed is:

1. A ramp handle for a ramp having a rail with an end face and a cross-section forming first and second channels separated by a channel-like joggle, the ramp handle comprising:
   a grip having a first grip end joined to an extension, said extension joined to an upright, and said upright joined to a second grip end, with said extension disposed generally perpendicular to said upright;
   a bridge having one end joined to said first grip end, and the other end of said bridge joined to said second grip end, said bridge oriented at an acute angle with respect to said upright;
   a first leg joined to said bridge adjacent said first grip end; and
   a second leg joined to said bridge adjacent to said second grip end, said first and second legs extending away from said bridge generally parallel to each other and parallel to said extension, and said first and second legs having cross-section for closely fitting into and engaging the rail first and second channels, respectively.

2. The handle of claim 1 wherein said grip, bridge, and first and second legs are formed as an integral one-piece slice from an extrusion.

3. The handle of claim 1 wherein said grip and bridge define a generally triangular opening therebetween.

4. The handle of claim 1 wherein said first and second legs each include at least one fastener opening.

5. The handle of claim 1 wherein said first and second legs have a generally square cross-section.

6. The handle of claim 1 wherein one of said first and second legs has a square cross section, and the other thereof has a rectangular cross section.

7. The handle of claim 1 further comprising butting surfaces on either side of said first and second legs.

8. The handle of claim 1 wherein said bridge is disposed at an angle to said first and second legs.

9. A ramp handle for a ramp having a rail with an end face and a cross-section forming first and second channels separated by a channel-like joggle, the ramp handle comprising:
   a planer one-piece integral unit sliced from an extrusion, including, an extension having a first grip end;
   an upright disposed substantially perpendicular to said extension, said upright having one end joined to said extension by an extension radius and having a bridge radius at the other end thereof joined to a second grip end;
   a bridge extending at an acute angle to said upright and joining said first and second grip ends, said bridge including first, second and third spaced apart abutting surfaces opposite said upright;
   a first leg joined to said bridge between said first and second butting surfaces and extending at an angle away from said bridge in a direction substantially parallel to said extension; and
   a second leg joined to said bridge in between said second and third butting surfaces, said second leg extending away from said bridge in a direction substantially parallel to said front leg, and said first and second legs having cross-sections for closely fitting into and engaging the rail first and second channels, respectively.

10. A ram handle-rail assembly comprising:
   a handle with a grip having a first handle end and a second handle end;
   a bridge integral with said grip and joining said first handle end and said second handle end;
   a first leg extending at an angle from said bridge adjacent to said first handle end;
   a second leg extending from said bridge adjacent to said second handle end generally parallel to said first leg;
   a rail having a first channel dimensioned to slidably engage over said first leg, and a second channel extending substantially parallel to said first channel and dimensioned to slidably engage over said second leg; and
   an end face oriented at an angle with respect to said channels which angle is substantially complimentary to the angle formed between said first and second legs and said bridge, and said end face engaging end surfaces on said bridge.

11. The ramp handle-rail assembly of claim 10 wherein said handle is a single integral section sliced from an aluminum extrusion.

12. The ramp handle-rail assembly of claim 11 wherein said rail is an aluminum extrusion.

13. The ramp handle-rail assembly of claim 11 wherein said handle is provided with at least one extruded hole in each of said first and second legs, and fastener means extended through each said hole for connecting said handle to said rail.

14. A ramp handle for a ramp having a rail with an end face and a cross-section forming upper and lower channels open on one side and separated by a channel-like joggle closed on that one side, the ramp handle comprising, a one-piece planar body of uniform thickness and cross-section formed by slicing a cross-section of an aluminum extrusion to that thickness, said body having a grip portion with an opening for gripping the handle, upper and lower legs extending parallel to each other from the grip portion, the upper leg having a rectangular cross-section for closely fitting the upper channel of the rail and the lower leg having a rectangular cross-section for closely fitting the lower channel, and said body having surfaces on said grip portion facing in the direction in which said legs extend for engaging the rail end face above, below and between said upper and lower legs.

15. The ramp handle of claim 14, wherein said body has at least one hole in each said leg for fastening said body to the rail.

16. The ramp handle of claim 15, wherein each of the holes is formed during extrusion and includes either an upwardly or downwardly facing opening from the hole to an edge of the body for accommodating a support for a hole die for forming that hole during extrusion.

17. The ramp handle of claim 14, wherein each leg has a side surface for full surface engagement with a surface in the upper or lower channel of the rail and upper and lower surfaces with at least a portion of each in engagement with downwardly and upwardly facing, respectively, surfaces in the upper or lower channel.

18. The ramp handle of claim 14, wherein the rail end face and the engaging body surfaces are at an angle to the direction in which the legs extend and perpendicular to the plane of the body.

* * * * *